Figure 8:
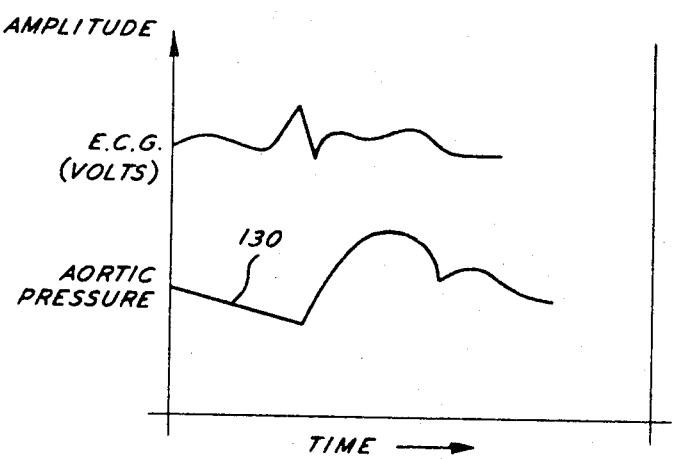

Aug. 23, 1966  E. G. VALLIERE  3,267,932
OPTICAL CATHETER MEANS
Filed Nov. 13, 1962  2 Sheets-Sheet 1
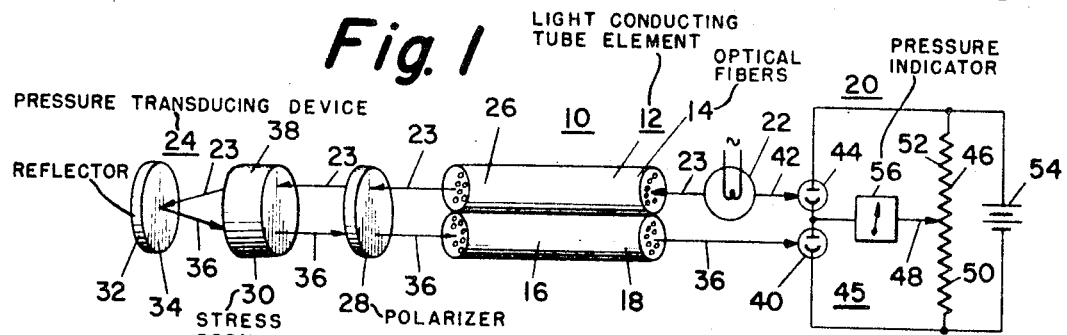
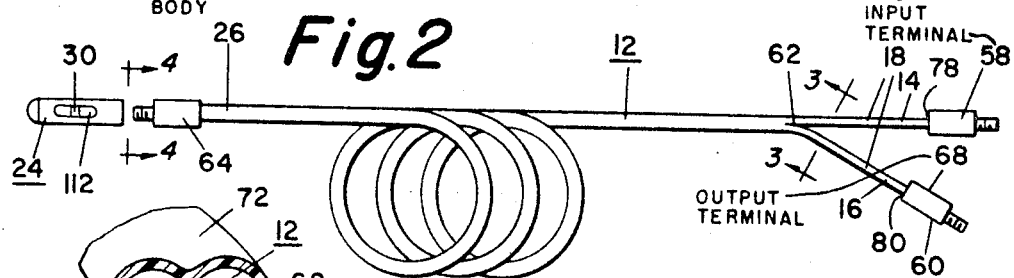
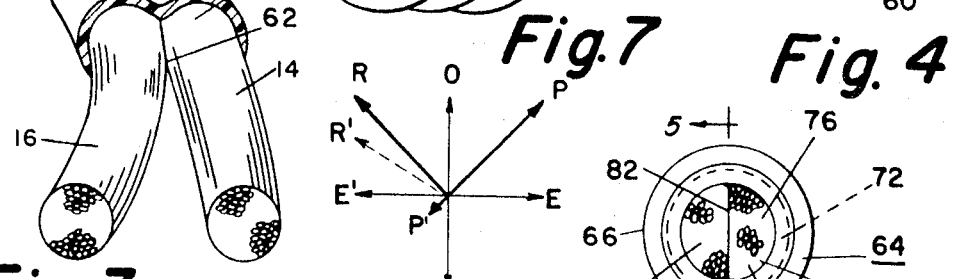
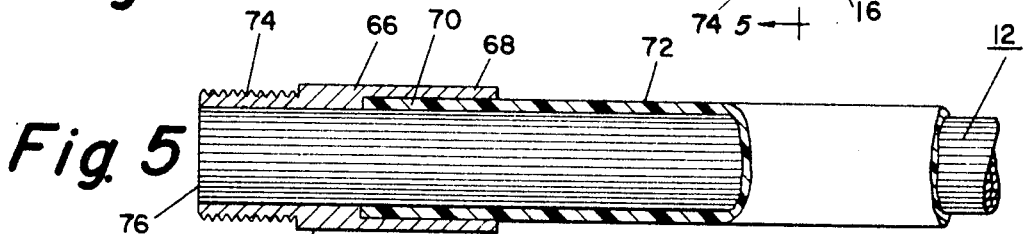
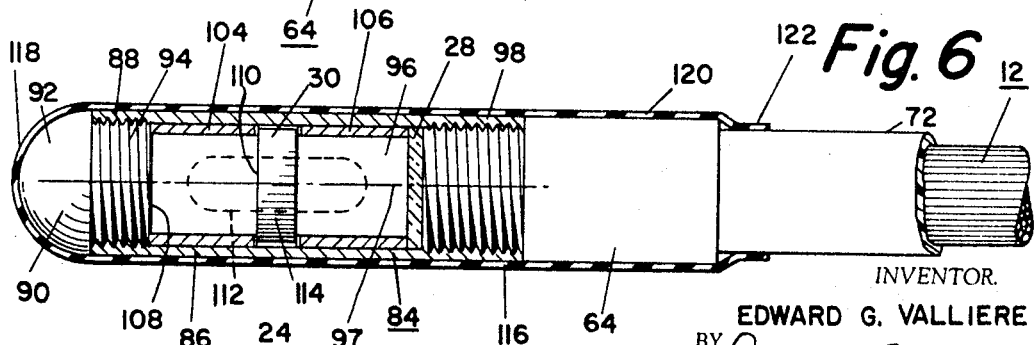
INVENTOR.
EDWARD G. VALLIERE
BY Jacob Trachtman
ATTORNEY Aug. 23, 1966  E. G. VALLIERE  3,267,932
OPTICAL CATHETER MEANS Filed Nov. 13, 1962  2 Sheets-Sheet 2

INVENTOR.
EDWARD G. VALLIERE
BY
Jacob Trachtman
ATTORNEY

United States Patent Office 3,267,932
Patented August 23, 1966

3,267,932
OPTICAL CATHETER MEANS
Edward G. Valliere, Roslyn, Pa., assignor to American Electronic Laboratories, Inc., Colmar, Pa., a corporation of Pennsylvania
Filed Nov. 13, 1962, Ser. No. 237,100
18 Claims. (Cl. 128—2.05)

The invention relates to catheter means, and more particularly, to means for insertion into the blood stream to measure intracardiac pressure effective at the locus of measurement.

Heretofore, catheters have been provided for measuring variations in pressure within the blood stream. However, such devices have not been effective for measuring static pressure or pressure variations of low frequencies, as well as the pressure variations of higher frequencies. Such prior art devices have also been affected by stray electric fields and have not provided a high degree of accuracy in the measurement of pressure in the intracardiac region.

It is, therefore, a principal object of the invention to provide a new and improved catheter means capable of providing pressure measurements with a high degree of accuracy and reliability.

Another object of the invention is to provide a new and improved catheter means for providing accurate measurements of static pressure, as well as the pressure variations having low and high frequencies.

Another object of the invention is to provide a new and improved catheter means utilizing optical principles eliminating and minimizing interference from electrical fields and providing measurements which are not affected by such fields.

Another object of the invention is to provide a new and improved catheter means utilizing a balanced bridge circuit providing a high degree of stability and accuracy.

Another object of the invention is to provide a new and improved catheter means of miniaturized size for passage into and through the blood stream and into the heart for obtaining measurements of pressure at the locus of measurement.

Another object of the invention is to provide a new and improved catheter means which is readily manufactured and can be maintained in operation with a minimum of repair.

The above objects, as well as many other objects of the invention, are achieved by providing catheter means including a flexible light conducting tube element for receiving and delivering light at its first end and a pressure transducing device secured with the second end of the element for receiving light conducted by said element. The transducing device delivers light to the tube element which is modified responsive to the pressure at the locus of the device. The transducing device modifies the light delivered to it by the element by varying its intensity responsive to the pressure at the locus of the device.

The transducing device comprises light polarizing means receiving light from the tube element and an optical stress body receiving light from the polarizing means and returning the light from the polarizing means after modifying the light responsive to the stress produced within the body by the pressure at the locus of the device. Thus, the polarizing means delivers to the tube element, light having an intensity related to the stress produced within the stress body.

The polarizing means and stress body are positioned within a hollow cylindrical case having a first enclosed end and a second end provided with means for securing the case with the second end of the tube element. The case includes means therein for reflecting incident light passing through the polarizing means and the stress body with the polarizing means being positioned proximate to the second end of the case and the stress body located between the polarizing means and light reflecting means. The reflected light then passes back through the stress body and polarizing means to the tube element for return to its first end.

A flexible member receives and seals within it the transducing device and transmits forces outside of said device to the periphery of the stress body through angularly displaced openings in the case proximate to the periphery of the stress body.

Output means for comparing light delivered to the first end of the tube element with modified light received from the first end of the tube element is provided using a bridge circuit. The bridge circuit has first and second light sensing devices in respective arms for respectively receiving light with amplitudes coresponding to the amplitudes of the light delivered to and received from the first end of the tube element. The current activated meter connected with the bridge is calibrated to indicate the pressure at the locus of measurement of the transducing device.

The foregoing and other objects of the invention will become more apparent as the following detailed description of the invention is read in conjunction with the drawings, in which:

FIGURE 1 is a diagrammatic drawing illustrating a catheter means embodying the invention, FIGURE 2 is a plan view of the tube element and transducing device of the catheter means with the transducing device detached from the tube element, FIGURE 3 is an enlarged perspective fragmentary view taken on the line 3—3 of FIGURE 2 with portions broken away, FIGURE 4 is an enlarged sectional view on the line 4—4 of FIGURE 2, FIGURE 5 is a sectional view partly in section of the second end of the tube element taken along the line 5—5 of FIGURE 4, FIGURE 6 is an enlarged sectional view of the transducing device shown in FIGURE 2 secured with the second end of the tube element, FIGURE 7 is a vector diagram illustrating the operation of the transducing device, and FIGURE 8 is a diagram graphically illustrating normal periodic variations in aortic pressure and electro cardiogram volts of the human heart.

Like reference numerals designate like parts throughout the several views.

Refer to FIGURE 1 which is a diagrammatic drawing illustrating the catheter means 10.

The catheter means 10 is provided with a light conducting tube element 12 comprising first and second bundles 14, 16 of optic fibers. The first end 18 of the tube element 12 is connected with output means 20 which includes a source of light comprising an electrically energized bulb 22. A light ray 23 from the bulb 22 is received by the bundle 14 of fibers at the first end of the element 12 and is delivered to the pressure transducing device 24 at the second end 26 of the tube element. At the device 24, the light ray 23 passes through a disc shaped circular polarizing means 28 and an optical stress body 30 to a body 32 having a light reflecting surface 34. The light ray 23 is reflected from the surface 34 as a light ray 36 having an angle of reflection equal to the angle of incidence. The reflected ray 36 then passes again through the optical stress body 30 and the circular polarizing means 28. The reflected light ray 36 from the transducing device 24 has its intensity modified to correspond with the stress produced in the stress body 30 by forces delivered about the periphery 38 of the cylindrical stress body 30. The manner of operation of the pressure transducing device 24 will be explained below in greater detail in connection with FIGURE 7.

The ray 36 delivered by the transducing device 24 is received at the second end 26 of the tube element 12 by the bundle 16 of optic fibers. The bundle of optic fibers 16 delivers the light ray 36 at the first end 18 of the tube element 12 to a photosensitive unit 40 of the output means 20. A light ray 42 is also received from the bulb 22 to a similar photosensitive unit 44 of the output means 20.

The photosensitive units 40 and 44 may be of the type commercially available which provide a resistance to current flow inversely proportional to the intensity of light impinging thereon.

The units 40 and 44 are arranged in respective arms of a bridge circuit 45 of output means 20 including the voltage divider 46 having an adjustable electrical contact 48 providing variable resistors 50, 52 for the remaining two arms of the bridge circuit 45 of output means 20. The voltage divider 46 is connected across a source of electromotive force, such as provided by the battery 54, while the units 40, 44 are joined in series and are also connected across the battery 54. The junction of the units 40, 44 and the contact 48 of the voltage divider 46 are bridged by a pressure indicating means 56 which may be a galvanometer calibrated to indicate pressure.

Thus, the contact 48 of the voltage divider 46 may be adjusted to provide a corrected pressure reading under controlled pressure conditions for the transducing device 24, thereby assuring the accuracy of the pressure readings upon its placement in the environment where pressure measurements are to be obtained. The use of the bridge circuit 45 and the comparison by the output means 20 of input and output rays delivered to and received from the transducing means 24, minimizes errors which may be due to variations in the intensity of the source of light from the bulb 22 or from variations or changes in the elements of the bridge circuit 45 and of the voltage provided to the bridge circuit by the battery 54 or changes in the tube 12 or device 24.

Thus, this arrangement provides high stability, reliability and accuracy of the readings obtained. The output means 20 provides readings of static pressure of the pressure at the locus of the transducing device 24, as well as indicating the variations in pressure. For showing the variations in pressure, the pressure indicator 56 may be a spectrum analyzer for determining the frequencies, or an oscilloscope may be utilized to determine wave form of such pressure variations having low and high frequency components.

The light transmitting tube element 12 is shown in FIGURE 2 as comprising an elongated member having a light input terminal 58 connected to the bundle 14 of fibers at the end 18 of the element 12, and a light output terminal 60 connected to the bundle 16 of fibers. The bundles 14 and 16 of fibers are separated from each other at the end 18 of the element 12, as clearly seen in FIGURES 2 and 3. The bundles 14 and 16 are combined and meet at point 62 to form a unitary element having a substantially circular cross section along its length to the opposite end 26 of the element 12 where the transducer terminal 64 is secured with the bundles 14 and 16, as shown in FIGURES 2 and 4.

FIGURE 5 shows the terminal 64 in greater detail as comprising a sleeve which may be made of metallic material having a central portion 66 which is received about the fibers of bundles 14, 16 at the end 26 of the element 12 and an extending annular portion 68 spaced from the bundles 14, 16 of optic fibers receiving and sealably securing therein the end 70 of a tubular cover 72 which completely encloses the bundles 14, 16 of optic fibers of said element 12. The cover is made of a non-toxic material suitable for being received within the human blood stream during the use of the catheter and for this purpose, may be made of nylon or other such appropriate material.

The outer end of the terminal 64 is provided with an externally threaded portion 74 for connection with the pressure transducing device 24. The ends of the bundles 14, 16 of the optic fibers are ground to provide a polished flat surface 76.

The terminals 58 and 60 respectively receiving the bundles 14 and 16 of the fibers at the end 18 of the tube element 12, may be provided with the identical structure as that of the terminal 64. Thus, the cover 72 which divides at 62 to separately cover the extensions of the bundles 14 and 16 of optic fibers, have ends 78, 80 which are similarly received under the extending portions 68 of the terminals 58, 60 for completely sealing the optic fibers of said tube element 12.

FIGURE 4 discloses in greater detail the end surface 76 of the bundles 14 and 16 of the optic fibers. The bundles of fibers 14 and 16 are arranged on opposite sides of the diameter line 82 in equal semicircular segments. Thus, the light delivered by the bundles 14 at the terminal 64 is on the left side of the diameter line 82, while the rays returned by the bundle 16 to the light output terminal 60 are received by the fiber ends which are all positioned to the right of the line 82, as seen in FIGURE 4. With this arrangement, the light delivered to the transducing device forms a beam 23 which is displaced to the left of the line 82 and is reflected and returned as a beam 36 to the ends of the fibers of the bundle 16 displaced to the right of the line 82. The displacement of the beam is achieved by the reflection of the beam with an angle equal to the angle of incidence to the reflecting surface. Since the reflecting surface 34 is a plane perpendicular to the flat end surface 76 of the bundles 14, 16 of optic fibers, the terminal 64 may be at an angular position about the longitudinal axis 97 of the device 24 in view of the symmetry of the arrangement for delivering the reflected ray 36 to the end surface 76 of the bundle 16 of fibers. The light delivered by the bundle 14 at the end 26, therefore, returns as reflected light to the bundle 16 of fibers which conducts the light to the output terminal 60 of the element 12. Satisfactory results may also be obtained when the fibers of bundles 14 and 16 are randomly intermixed at the end surface 76 of the terminal 64.

The tube element 12 has an internal cross sectional diameter of approximately five-hundredths of an inch and is made of a length, such as 36 inches, sufficient to be received into an artery or vein through an opening in the arm and passed through the artery or vein into the intracardiac region. The light conducting element 12 is made of a plurality of flexible glass fibers formed into the bundles 14 and 16, generally referred to as light pipes, and particularly suited for being inserted into and passed along the arteries and veins of a subject during its insertion for use as an intracardiac catheter. The transducing device 24 which is one-half inch long and has an outside diameter of one-eighth inch, is attached to the terminal 64 of the tube means 12 and is the end introduced into the artery or vein of the subject for providing measurements of pressure at the locus of the transducing device 24.

FIGURE 6 discloses an enlarged sectional view of the pressure transducing device 24 shown attached to the terminal 64 of the tube element 12. The transducing device 24 comprises a cylindrical case 84 which may be formed from a section of metal cylindrical tube 86. The forward end 88 of the tube is provided with internal threads threadedly engaging an enclosing cap 90. The cap 90 has a hemispherical outer end 92 and a threaded shank 94 received within and threadedly engaging the end 88 of the case 84 providing a chamber 96 therewithin. The other end 98 of the case 84 has the tube 86 provided with internal threads for engaging the threaded portion 74 of the terminal 64.

The circular polarizing means 28 which may be in the form of a disc is received within the chamber 96 of the device 24 perpendicular to the longitudinal axis 97 of the device 24 and positioned proximate to the flat surface 76 of the ends of the bundles 14 and 16 of optic fibers. The means 28 may also be secured by cementing it to the surface 76.

The stress body 30 may be made in cylindrical form from the photo stress plastic sheet material known as type S or M of the Instrument Division of Budd Company. The body 30 is also positioned within the chamber 96 of the device 24 between the ends 88, 98 of the case 86. The stress body 30, which has its axis aligned with the central longitudinal axis 97 of the transducing device 24, is retained in this position by two cylindrical spacer tube sections 104 and 106 within the tube 86 and on each side of the body 30. The body 30 is dimensioned to be loosely retained in its spaced position so that stresses upon the body due to its mounting within the device 24 are eliminated or minimized.

The threaded shank 94 of the enclosing cap 90 is provided with a flat polished light reflecting surface 108 perpendicular to the longitudinal axis 97. Alternately, if desired, the surface 110 of the stress body 30 could similarly be provided with a coating for providing the reflecting surface of the device 24 in place of the reflecting surface 108.

The tube 86 of the case 84 is provided with a pair of oppositely positioned elongated openings 112 located proximate to the periphery of the stress body 30. The openings 112 serve to communicate forces to the body 30 on opposite sides of its periphery from the locus outside of the device 24.

A diaphragm or casing 116 which may be a rubber molded cylinder ending in a hemispherical tip and having a thickness of one-hundredth of an inch, is snugly received over and conforms to the surface of the device 24. The enclosed end 118 of the casing 116 forms a hemispherical surface at the forward end of the device, facilitating the insertion and movement of the catheter means 10 into the arteries and veins of a subject. The other end 120 of the casing 116 extends over the terminal 64 and is secured at its extremity 122 with the cover 72 of the tube element 12, thereby completely sealing and closing the transducing device 24. While sealing the device 24 and its chamber 96, the casing 116 transmits the force of the pressure about the device 24 through the openings 112 to opposite sides of the stress body 30 providing a stress within the body 30 related to the pressure at the locus of the transducing device 24.

Refer to FIGURE 7 for a description in greater detail of the operation of the transducing device 24. Light delivered from the source 22 by the bundle 14 of the tube element 12 is first received at the transducing device 24 by the circular polarizing means 28. The circular polarizing means 28 comprises a disc shaped body and is known in the art as a neutral circular polarizer. Such a polarizer is available commercially as type HNCP35 of the Polaroid Corporation. The polarizing means 28 is provided with a first layer positioned proximate to the tube element 12, which plane polarizes the incident light at an angle of 45 degrees to the vertical direction, as indicated by the vector P of FIGURE 7. Plane polarization is the property of certain transparent crystalline substances which transmit light therethrough which vibrates only in one direction. Such direction is taken as the direction of the E-vector of the light as explained in detail in the standard text entitled "Optics" by Francis Weston Sears, published by Addison-Wesley Publishing Company, Inc., third edition, April 1956. The second layer following the first layer of the polarizing means is a one-quarter wave length delay plate which delays the ordinary wave with respect to the extraordinary wave of the plane polarized light received from the first layer of the polarizing means 28. The ordinary and extraordinary waves are mutually perpendicular vector components of the plane polarized wave P, which travel with different velocities through the second layer of the circular polarizing means 28, as explained in greater detail in the standard text entitled "Optics" by Bruno Rossi, published by Addison-Wesley Publishing Company, Inc., 1957, particularly in chapter 6 entitled "Polarization and Crystal Optics." The vertical component of the vector P which is propagated through the second layer as the ordinary wave is indicated as the vector O in FIGURE 7, while the horizontal component of the vector P which is propagated as the extraordinary wave is shown as the vector E. Reflection of the light ray 23 at the reflecting surface 108 results in the phase inversion of the vector E to the vector E' and the vector O to the vector shown as O' in the reflected beam of light 36, as shown in FIGURE 7. Such phase inversion upon reflection was first theoretically derived by Fresnel and are known as Fresnel's laws of reflection. The laws are given in detail and derived by the electromagnetic theory in the standard text entitled "Fundamentals of Optics," by Francis A. Jenkins and Harvey E. White, published by McGraw-Hill Book Company, Inc., 1957.

In passing in each direction through the stress body 30, the ordinary and extraordinary components of the beams 23 and 36 are delayed corresponding to the force exerted on or stress of the body 30. When the reflected ray 36 reaches the second layer of the polarizing means 28, the ordinary wave is again delayed one-quarter wave length with respect to the extraordinary wave as it passes therethrough. When the beam of light 36 reaches the first layer of the polarizing means 28, the total delay of the ordinary wave with respect to the extraordinary wave caused by the polarizing means is a half wave length. This results in the inversion of the vector O' to the direction of the vector O shown in FIGURE 7, provided that the ordinary wave is not delayed with respect to the extraordinary wave in passing through the stress body 30 as the incident and reflected beams of light 23 and 36. Under this assumption, the extraordinary and ordinary waves combine to produce a resultant vector indicated as R which is perpendicular to the vector P of FIGURE 7. Since the resultant vector R is at 90 degrees to the plane polarizing direction of the first layer of the polarizing means 28, the light beam 36, under these conditions, is not transmitted therethrough from the detecting device 24 to the tube element 12. Thus, in this example, in the absence of pressure and the resultant stress in the stress body 30, the intensity of light delivered by the device 24 is a minimum.

When a force is applied to the body 30, the ordinary wave is delayed with respect to the extraordinary wave in passing through the body 30 as the incident and reflected rays 23, 36, so that the ordinary wave of the ray 36 delivered to the first layer of the polarizing means 28 is delayed more than a half wave length. The ordinary and extraordinary waves combine to provide a resultant wave having a vector shown as R' in FIGURE 7. The vector R' rotates in direction to represent an elliptically polarized wave which has a vector component shown as P' in FIGURE 7 along the vector P, the direction of the plane polarization of the first layer of the polarizing means. The polarizing means 28 transmits a ray of light 36 therethrough having an amplitude indicated by the length of the vector P'. The amplitude of the vector P' depends upon the stress on the body 30, and increases in amplitude with the increase in pressure at the locus of the device 24. Because intensity is a function of the square of the amplitude of vector P', the intensity of light in the ray 36 from the device 24 is modified as a sine square function of pressure. Since the transducer is to be used only within the first order effects, measurements are taken along the linear portion of the sine square curve.

The light beams utilized are not affected by electric fields which may be in the region where the catheter means is being used. Therefore, the readings are not affected by such fields and the accuracy of the readings is greater and more reliable.

The curve 130 of FIGURE 8 illustrates variations in aortic pressure of the human heart as a function of time which may be accurately measured as a function of time by the catheter means 10. The use of the transducing device 24, as described, utilizing optical principles also affords a measuring apparatus which allows static pressure measurements as well as dynamic pressure measurements providing both low and high frequency components of pressure variations at the locus of measurement.

It will, of course, be understood that the description and drawings, herein contained, are illustrative merely, and that various modifications and changes may be made in the structure disclosed without departing from the spirit of the invention.

What is claimed is:

1. Catheter means including a flexible light conducting tube element having a first end with means for receiving light from an external source and a second end, and a pressure transducing device for being insertable into the vascular system secured with the second end of said element for receiving light conducted by said element and delivering to the first end of said element light which is modified by said device responsive to the fluid pressure surrounding the locus of said device in the vascular system.

2. The means of claim 1 in which said transducing device includes means for modifying the light delivered to said element by varying its intensity responsive to the pressure at the locus of said device.

3. The means of claim 1 in which said device comprises light polarizing means receiving light from said element, an optical stress body receiving light from said polarizing means and returning said light through said polarizing means after modifying said light responsive to the stress produced within said body by the pressure at the locus of said device, said polarizing means delivering to said element light having an intensity related to the stress produced within said body.

4. The means of claim 3 in which said device includes a hollow cylindrical case having a first enclosed end and a second end provided with means for securing said case with the second end of said tube element, means for reflecting light being provided within said case with said polarizing means being positioned within said case proximate its second end and said stress body being positioned within said case between said reflecting means and said polarizing means, said case having angularly displaced openings proximate to the periphery of said stress body for communicating external forces to said stess body.

5. The means of claim 4 including a flexible member receiving and sealing within it said device and transmitting forces located outside said device to the periphery of said stress body through the openings of said case.

6. The means of claim 5 in which said tube element comprises first and second pluralities of flexible light conducting fibers respectively arranged in first and second bundles, said first and second bundles respectively providing input and output light terminals at the first end of said element, the first and second bundles of said fibers providing a transducer terminal at the second end of said element having a circular cross section with said first and second bundles of fibers respectively arranged in first and second semicircular segments for delivering and receiving light from said device, the light reflecting means of said device receiving incident light from the first bundle of fibers of said element through said polarizing means and stress body and delivering reflected light through said stress body and polarizing means to the second bundle of fibers of said element.

7. In an optical catheter means, a pressure transducing device for insertion into the vascular system at the end of a catheter tube element including light polarizing means and an optical stress body for modifying light responsive to the fluid pressure surrounding the locus of said device in the vascular system, said device having a connecting means for being joined with said catheter tube element and receiving light from and delivering light modified by said device to said element.

8. The combination of claim 7 in which said pressure transducing device comprises a hollow cylindrical case receiving therein said polarizing means and stress body, the first end of said case being enclosed while the second end of said case is provided with said connecting means for securing said case with said catheter tube element.

9. The combination of claim 8, including means for reflecting light within said case and in which said polarizing means is positioned within said case proximate its second end to receive light from said element and said stress body is positioned within said case between the light reflecting means and said polarizing means to receive light from said polarizing means and return said light through said polarizing means after modifying such light responsive to the stress produced within said body by the pressure at the locus of said device, said polarizing means delivering light from said device having an intensity related to the stress produced within said body.

10. The combination of claim 9 in which said case is provided with angularly displaced openings proximate to the periphery of said stress body, and includes a flexible member receiving for sealing within it said device and transmitting forces outside said device to the periphery of said stress body through the openings of said case.

11. The combination of claim 10 in which said polarizing means comprises a circular polarizer providing a plane polarizing first portion for receiving light by said device and delivering light plane polarized in a predetermined direction and a quarter wave plate second portion for receiving polarized light from said first portion and delivering said light to said reflecting means of said device through said stress body, said second portion of said polarizing means receiving light reflected from said reflecting means after passing through said stress body and delivering polarized light to said first portion of said polarizing means, said first portion of said polarizing means delivering therethrough the component of light from said second portion which is polarized in said predetermined direction, the delay in the transmission of the components of light through said stress body being a function of the stress exerted upon said body by said external forces thereby varying the amplitude of the light delivered by said device in relation to the pressure at the locus of said device.

12. In an optical catheter means, a catheter tube element for insertion into the vascular system having first and second ends and comprising first and second pluralities of flexible light conducting fibers respectively arranged in first and second bundles, said first and second bundles respectively having input and output light terminals at the first end of said element, the first and second bundles of said fibers having a pressure transducer terminal at the second end of said element for respectively delivering light to and receiving light from a fluid pressure transducing device secured with said transducer terminal and responsive to the fluid pressure surrounding the locus of said device in the vascular system.

13. The element of claim 12 in which said first and second bundles of said fibers provide a pressure transducer terminal at the second end of said element having a circular cross section with said first and second bundles of fibers respectively arranged in first and second semicircular segments.

14. The element of claim 12 in combination with a non-toxic covering means received about and along said element for enclosing and preventing contact of said fibers with the substances within which said element is placed when used as said catheter means.

15. An optical catheter means including a flexible light conducting tube element for insertion into the vascular system having a first end providing a light input terminal and a light output terminal, and a second end providing a transducer light connecting terminal having an output delivering light received by the input terminal of said first end and an input for transmitting light to the output terminal; a pressure transducing device secured with the second end of said element receiving light from said element and delivering to said element light which is modified by said device responsive to the fluid pressure surrounding the locus of said device in the vascular system; and output means comparing light received by the input terminal and delivered by output terminal of said first end of said element for determining the fluid pressure at the locus of said device in said vascular system.

16. The means of claim 15 in which said device modifies the light delivered to the input of said transducer terminal by varying the amplitude of the light responsive to the pressure at the locus of said device and said output means compares the amplitudes of the light received by the input terminal and delivered by the output terminal of said first end of said element for determining the pressure at the locus of said device.

17. The means of claim 16 in which said output means comprises a bridge circuit having first and second light sensing devices in respective first and second arms detecting respectively light with amplitudes corresponding to the amplitudes of the light delivered to the input terminal and received from the output terminal of the first end of said element.

18. The means of claim 17 in which said bridge circuit includes a current activated meter connected with respect to the arms of said bridge circuit and calibrated to indicate the pressure at the locus of said pressure transducing device.

References Cited by the Examiner

UNITED STATES PATENTS

| | | | |
|---|---|---|---|
| 2,976,865 | 3/1961 | Shipley | 128—2.05 |
| 3,051,003 | 8/1962 | Witt | 88—1 |
| 3,068,739 | 12/1962 | Hicks | 128—6 X |
| 3,136,310 | 6/1964 | Meltzer | 128—2 |
| 3,167,658 | 1/1965 | Richter | 128—2.05 X |

OTHER REFERENCES

"Optics," third edition, published April 1956, chapter 7.

RICHARD A. GAUDET, *Primary Examiner.*

LOUIS R. PRINCE, *Examiner.*

S. BRODER, *Assistant Examiner.*